United States Patent Office 3,299,078
Patented Jan. 17, 1967

3,299,078
PYRIDO[3',4':4,5]PYRROLO[3,2,1-hi]INDOLES AND -[3,2,1-ij]QUINOLINES
Irwin J. Pachter, Erdenheim, Pa., assignor to Smith Kline & French Laboratories, Philadelphia, Pa., a corporation of Pennsylvania
No Drawing. Filed Oct. 1, 1962, Ser. No. 227,579
5 Claims. (Cl. 260—296)

This invention relates to novel pyrido[3',4':4,5]pyrrolo[3,2,1-hi]indoles and -[3,2,1-ij]quinolines having pharmacodynamic activity and to novel intermediates in their preparation.

More specifically, the pyrido-pyrrolo-indoles and quinolines of this invention have analgesic, anti-pyretic, anti-inflammatory, anti-serotonin and central nervous system stimulant activity.

The novel products of this invention are represented by the following formula:

*Formula I*

![Formula I structure]

when:

$R_1$ represents hydrogen, halogen, lower alkyl, lower alkoxy or trifluoromethyl;
$R_2$ represent hydrogen, lower alkyl or phenyl;
$R_3$ represents hydrogen or lower alkyl;
$R_4$ represents hydrogen, lower alkyl or benzyl; and
A represents —$CH_2$— or —$CH_2CH_2$—.

The phenyl substituent of $R_2$ may be substituted by inert substituents such as halogen, lower alkyl, lower alkoxy or trifluoromethyl.

Advantageous products of this invention are represented by the following formula:

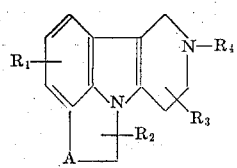

when:

$R_1$ represents hydrogen, chloro, methyl, methoxy or trifluoromethyl;
$R_2$ represents lower alkyl or, preferably, phenyl;
$R_4$ represents lower alkyl; and
A represents —$CH_2$— or —$CH_2CH_2$—.

By the terms "lower alkyl" and "lower alkoxy" where used herein, groups having from 1 to 6, preferably 1 to 2 carbon atoms, are indicated.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition, this invention includes nontoxic, pharmaceutically acceptable, quaternary ammonium salts of the above defined bases formed with a reactive lower alkyl halide, sulfate, p-toluene sulfonate, benzene sulfonate or lower alkyl sulfonate. The quaternary ammonium salts are prepared by mixing the reactants preferably in a solvent such as ether, acetone or a lower alkanol, for example methanol or ethanol, evaporating the solvent and recrystallizing the residue from a suitable solvent such as ethanol-ether.

The pyrido[3',4':4,5]pyrrolo[3,2,1-hi]indoles and pyrido[3,4':4,5]pyrrolo[3,2,1-ij]quinolines of this invention are prepared by the following procedure:

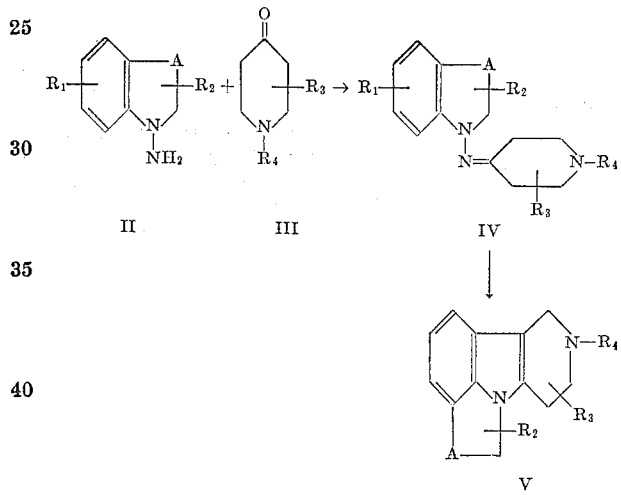

The terms $R_1$, $R_2$, $R_3$ and A are as previously defined and $R_4$ is lower alkyl, benzyl or benzoyl.

According to the above procedure a 1-aminoindoline or 1-amino-1,2,3,4-tetrahydroquinoline is condensed with a 4-piperidone compound to give the intermediates of Formula IV. The reaction is preferably carried out at about 25-50° C. for about 20 to 60 minutes in the presence of a dilute mineral acid such as sulfuric or hydrochloric acid or an organic acid such as acetic or formic acid or a combination of said mineral acid and organic acid. The reaction mixture is worked up by neutralizing, extracting with a nonaqueous organic solvent such as ether or benzene and removing the solvent from the extracts to give the intermediate of Formula IV.

Heating the above prepared intermediate with a dilute mineral acid such as sulfuric or hydrochloric acid or with an organic acid such as acetic or formic acid or a combination of these at about 75–100° C. for about 30–120 minutes and working up by neutralizing, extracting into a nonaqueous organic solvent such as ether or benzene and removing the solvent from the extracts yields the pyrido [3',4':4,5]pyrrolo[3,2,1-hi]indoles and -[3,2,1-ij]quinolines of Formula V.

Alternatively the products of this invention are prepared directly by reaction of the 1-aminoindoline or 1-amino-1,2,3,4-tetrahydroquinoline of Formula II with the 4-piperidone of Formula III without isolation of the intermediate (IV). The reactants are heated with acid as described above at about 75–120° C. for about 30–120 minutes and worked up as described hereabove to give the products of Formula V.

The compounds of Formula I in which $R_4$ is hydrogen are prepared according to the above described procedure using a 1-benzoyl or 1-benzyl-4-piperidone as the starting material of Formula III and removing the N-benzoyl or N-benzyl group from the resulting product of Formula V by hydrolysis of the N-benzoyl or catalytic hydrogenation of the N-benzyl moiety.

The 1-aminoindoline and 1-amino-1,2,3,4-tetrahydroquinoline starting materials are prepared by nitrosating the corresponding indoline or tetrahydroquinoline and reducing the resulting 1-nitroso compound for example using zinc and acetic acid to give the 1-amino starting materials.

The compounds of this invention in which $R_3$ is a substituent other than hydrogen are present as mixtures of $d$ and $l$ optical isomers. It is intended to include within the scope of this invention the separated $d$ and $l$ isomers as well as the mixtures thereof.

The following examples are not limiting but are illustrative of the compounds of this invention and the procedures for their preparation and will serve to make fully apparent all of the compounds embraced by the general formula given above.

EXAMPLE 1

Fifteen grams of 1-amino-2-phenylindoline are added to 8.9 g. of N-methyl-4-piperidone and the resulting mixture is heated on a steam bath. A few drops of acetic acid are added, the heating is continued for ten minutes and 10 ml. of 10% sulfuric acid in ethanol are added. The mixture is heated at reflux for 20 minutes, then concentrated in vacuo. The residue is treated with water and extracted with ether. The aqueous layer is made basic with ammonia and cooled. The precipitate is collected by filtration and recrystallized from methanol to give 1,2,6,7,8,9 - hexahydro - 7 - methyl - 1 - phenylpyrido [3′,4′:4,5]pyrrolo[3,2,1-hi]indole, M.P. 148–149° C.

An acetone solution of 1.7 g. of 1,2,6,7,8,9-hexahydro-7 - methyl - 1 - phenylpyrido[3′,4′:4,5]pyrrolo[3,2,1-hi]indole is treated with 0.84 g. of methyl iodide while warm. The mixture is cooled and the precipitate is filtered off, dried and recrystallized from acetone to give 1,2,6,7,8,9 - hexahydro - 7 - methyl - 1 - phenylpyrido [3′,4′:4,5]pyrrolo[3,2,1-hi]indole methiodide, M.P. 165–167° C.

EXAMPLE 2

A mixture of 11.0 g. of 1-aminoindoline and 9.4 g. of N-methyl-4-piperidone is heated on a steam bath and treated with a few drops of acetic acid. The heating is continued for 15–20 minutes and 50 ml. of 90% formic acid are added. The mixture is diluted with water and made basic with ammonium hydroxide solution. The resulting precipitate is extracted with benzene and the extracts are passed through an alumina column. The benzene is evaporated in vacuo and the residue is treated with methanol and filtered. The filtrate is concentrated, then poured into an ether solution of hydrogen bromide. The precipitate is collected by filtration and recrystallized from aqueous ethanol to give 1,2,6,7,8,9-hexahydro-7-methylpyrido[3′,4′:4,5]pyrrolo[3,2,1 - hi]indole hydrobromide, M.P. 224–225° C.

The free base is prepared by extracting an aqueous solution of the hydrobromide salt with ether, and evaporating the ether from the extracts in vacuo.

EXAMPLE 3

A mixture of 12.0 g. of 1-amino-1,2,3,4-tetrahydroquinoline and 10.3 g. of N-methyl-4-piperidone is heated on a steam bath. A few drops of glacial acetic acid are added and the heating is continued for 10–15 minutes. To the mixture are added, slowly, 50 ml. of 90% formic acid.

The mixture is cooled, diluted with water and made basic with ammonium hydroxide. The solid material is filtered off and dissolved in benzene. The benzene solution is dried, filtered, concentrated to ½ volume, passed through an alumina column and evaporated to dryness in vacuo. The residue is recrystallized from ether to give 2,3,7,8,9,10 - hexahydro - 8 - methyl-1H-pyrido[3′,4′:4,5]-pyrrolo[3,2,1-ij]quinoline.

To a warm acetone solution containing 2.4 g. of the above prepared base in acetone is added 1.5 g. of methyl iodide. The mixture is cooled and filtered and the product is recrystallized from methanol to give 2,3,7,8,9,10-hexahydro - 8 - methyl - 1H - pyrido[3′,4′:4,5]pyrrolo [3,2,1-ij]quinoline methiodide, M.P. 235–240° C. (dec.).

EXAMPLE 4

6-methoxy-1,2,3,4-tetrahydroquinoline (100 g.) is dissolved in 500 ml. of 12% sulfuric acid solution. The solution is cooled to 0° C. and 51.0 g. of sodium nitrite in 71 ml. of water are added slowly with stirring keeping the temperature at 0° C. The mixture is allowed to stand for 10 minutes. The solid material is filtered off and recrystallized from ether to give 6-methoxy-1-nitroso-1,2,3,4-tetrahydroquinoline.

The above prepared nitroso compound (86.0 g.) is dissolved in 855 ml. of dry methanol. Zinc dust (206 g.) is added and the mixture is cooled to 5–10° C., then treated with 285 ml. of acetic acid keeping the temperature below 10° C. The mixture is stirred for 2–3 hours, then allowed to stand overnight. The liquid is decanted and evaporated in vacuo. The unreacted zinc is washed with water, the washings are added to the methanol residue and the combined solution is made basic with 40% sodium hydroxide. The basic solution is extracted with ether and the extracts are dried, filtered, concentrated and distilled to give 1-amino-6-methoxy-1,2,3,4-tetrahydroquinoline.

A mixture of 17.8 g. of 1-amino-6-methoxy-1,2,3,4-tetrahydroquinoline and 12.5 g. of N-methyl-4-piperidone is warmed on a steam bath and treated with a few drops of acetic acid. The heating is continued for 15 minutes and 50 ml. of 90% formic acid are added.

Treating the cooled reaction mixture with water and excess ammonium hydroxide solution and working up the resulting mixture gives 2,3,7,8,9,10-hexahydro-5-methoxy-8-methyl - 1H - pyrido[3′,4′:4,5]pyrrolo[3,2,1-ij]quinoline, M.P. 135–136° C.

An ether solution of the base is treated with excess dilute hydrochloric acid. The precipitate is isolated by filtration to give 2,3,7,8,9,10-hexahydro-5-methoxy-8-methyl-1H-pyrido[3′,4′:4,5]pyrrolo[3,2,1-ij]quinoline hydrochloride.

Similarly treating an ether solution of the free base with excess glacial acetic acid gives the acetate salt.

EXAMPLE 5

By the procedure of Example 4, 21.0 g. of 2-phenyl-1,2,3,4-tetrahydroquinoline in 300 ml. of 6% sulfuric acid at 0° C. are treated with 8.5 g. of sodium nitrite in aqueous solution to give 1-nitroso-2-penyl-1,2,3,4-tetrahydroquinoline. Reduction of the 1-nitroso compound using zinc dust and acetic acid gives 1-amino-2-phenyl-1,2,3,4-tetrahydroquinoline.

A mixture of 1.12 g. of 1-amino-2-phenyl-1,2,3,4-tetrahydroquinoline and 0.6 g. of N-methyl-4-piperidone is warmed on a steam bath. Two drops of glacial acetic acid are added and the mixture is warmed for 10 minutes, then cooled and treated with 3 ml. of 10% sulfuric acid in absolute alcohol. The heating is continued for 30 minutes, then the mixture is cooled, diluted with water, neutralized with ammonia and extracted with ether. The extracts are dried, filtered and the solvent is removed in vacuo. The residue is recrystallized from hexane to give 1-(N-methyl-4-piperidylideneamino)-2-phenyl-1,2,3,4-tetrahydroquinoline, M.P. 93° C.

The above prepared intermediate is treated with a few drops of glacial acetic acid. The mixture is heated on a steam bath and 10 ml. of 90% formic acid are added. Heating is continued for 10 minutes longer, then the mixture is cooled, diluted with water, neutralized with ammonia and extracted with ether. The ether is evaporated from the extracts and the residue is recrystallized from isopropanol to give 2,3,7,8,9,10-hexahydro-8-methyl-1 - phenyl-1H-pyrido[3',4':4,5]pyrrolo[3,2,1-ij] - quinoline, M.P. 129–130° C.

Treating an ether solution of the above prepared base with p-toluene sulfonic acid gives, after cooling and filtering, the p-toluenesulfonate salt.

EXAMPLE 6

A mixture of 4.95 g. of 1-amino-2-phenyl-1,2,3,4-tetrahydroquinoline, prepared as in Example 5, and 4.9 g. of N-benzyl-4-piperidone is warmed on a steam bath with three drops of acetic acid for 5–10 minutes. The solution is cooled and 10 ml. of 90% formic acid are added. Heating is continued for 10 minutes, then the solution is cooled, diluted with 25 ml. of water and neutralized with ammonia. The aqueous layer is decanted. The residue is stirred with water, the water is decanted and methanol and isopropanol are added. The alcoholic solution is treated with charcoal, filtered, concentrated, cooled and filtered to give a solid product which on recrystallization from isopropanol yields 8-benzyl-2,3,7,8,9,10-hexahydro-1-phenyl - 1H - pyrodo[3',4':4,5]pyrrolo[3,2,1-ij]quinoline, M.P. 163–164° C.

EXAMPLE 7

By the procedure of Example 6, 1-amino-1,2,3,4-tetrahydroquinoline is reacted with N-benzyl-4-piperidone to give 8 - benzoyl - 2,3,7,8,9,10 - hexahydro - 1H - pyrido [3',4':4,5]pyrrolo[3,2,1-ij]quinoline, M.P. 155–157° C.

The above prepared 8-benzoyl compound is refluxed with hydrochloric acid for one hour. The mixture is washed with ether, basified with sodium hydroxide solution and extracted with ether. The solvent is removed in vacuo from the ether extracts to give as the residue 2,3,7,8,9,10 - hexahydro - 1H - pyrido[3',4':4,5] - pyrrolo [3,2,1-ij]quinoline.

EXAMPLE 8

According to the procedure of Example 2, 1-amino-indoline is reacted with:

N-ethyl-4-piperidone,
N-butyl-4-piperidone,
1,3-dimethyl-4-piperidone,
1,2-dimethyl-4-piperidone and
2-methyl-1-propyl-4-piperidone to give:

1,2,6,7,8,9-hexahydro-7-ethyl-pyrido[3',4':4,5]pyrrolo-[3,2,1-hi]indole,
1,2,6,7,8,9-hexahydro-7-butyl-pyrido[3',4':4,5]pyrrolo-[3,2,1-hi]indole,
1,2,6,7,8,9-hexahydro-7,9-dimethylpyrido[3',4':4,5]-pyrrolo[3,2,1-hi]indole,
1,2,6,7,8,9-hexahydro-6,7-dimethyl (and 6,8-dimethyl)-pyrido[3',4':4,5]pyrrolo[3,2,1-hi]indole and
1,2,6,7,8,9-hexahydro-6-methyl (and 8-methyl)-7-propylpyrido[3',4':4,5]pyrrolo[3,2,1-hi]indole, respectively.

The mixture of isomers formed in the last two instances are separated by fractional crystallization techniques.

EXAMPLE 9

Reacting 1-amino-2-methylindoline with N-methyl-4-piperidone using glacial acetic acid and formic acid as in Example 2 gives 1,2,6,7,8,9-hexahydro-1,7-dimethyl-pyridol[3',4':4,5]pyrrolo[3,2,1-hi]indole.

EXAMPLE 10

By the procedure of Example 4, 6-chloro-1,2,3,4-tetrahydroquinoline is treated with sulfuric acid and sodium nitrite and the resulting 1-nitroso compound is reduced with zinc and acetic acid to give 1-amino-6-chloro-1,2,3,4-tetrahydroquinoline.

Heating a mixture of 18.2 g. of 1-amino-6-chloro-1,2,3,4-tetrahydroquinoline and 12.5 g. of N-methyl-4-piperidone on a steam bath, adding a few drops of acetic acid, continuing the heating for 30 minutes, adding 50 ml. of 90% formic acid, heating for 15 minutes and working up as in Example 3 gives 5-chloro-2,3,7,8,9,10-hexahydro - 8 - methyl - 1H - pyrido[3',4':4,5]-pyrrolo[3,2,1-ij] quinoline.

Similarly using 6-methyl - 2-phenyl - 1,2,3,4-tetrahydroquinoline as the starting material, the product is 1,2,6,7, 8,9 - hexahydro - 5,8 - dimethyl - 1 - phenyl - 1H - pyrido [3',4':4,5]pyrrolo[3,2,1-ij]quinoline.

By the same procedure, using 7-trifluoromethyl-1,2, 3,4-tetrahydroquinoline as the starting material, 1,2,6, 7,8,9-hexahydro - 8-methyl - 6-trifluoromethyl - 1H-pyrido [3',4':4,5]pyrrolo[3,2,1-ij]quinoline is obtained.

In the same manner using 4-methylindoline as the starting material, the product is 1,2,6,7,8,9-hexahydro-3,7-dimethylpyrido[3',4':4,5]pyrrolo[3,2,1-hi]indole.

EXAMPLE 11

A mixture of 15.0 g. of 1-amino-2-phenylindoline and 9.5 g. of N-ethyl-4-piperidone is treated with two drops of acetic acid and, with stirring, 10 ml. of 10% sulfuric acid in ethanol at room temperature to give 1-(N-ethyl-4-piperidylideneamino)-2-phenylindoline.

Similarly, when the analogous starting materials in Examples 1–4 and 6–10 are reacted in acid medium at about room temperature to 50° C. the 1-(4-piperidylideneamino) intermediate is obtained.

These intermediates are converted to the products of this invention by the procedure of Example 5.

What is claimed is:
1. A compound selected from the group consisting of a free base and its nontoxic, pharmaceutically acceptable, acid addition and quaternary ammonium salts, the free base having the formula:

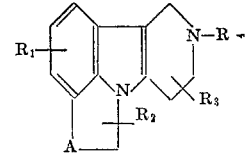

in which:

$R_1$ is a member selected from the group consisting of hydrogen, halogen, lower alkyl, lower alkoxy and trifluoromethyl;

$R_2$ is a member selected from the group consisting of hydrogen, lower alkyl and phenyl;

$R_3$ is a member selected from the group consisting of hydrogen and lower alkyl;

$R_4$ is a member selected from the group consisting of hydrogen, lower alkyl and benzyl; and A is a member selected from the group consisting of —CH$_2$— and —CH$_2$CH$_2$—.

2. A compound of the formula:

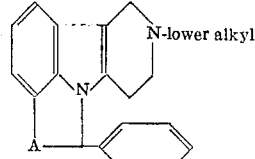

in which A is a member selected from the group consisting of —CH$_2$— and —CH$_2$CH$_2$—.

3. A compound of the formula:

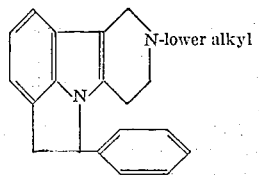

4. A compound of the formula:

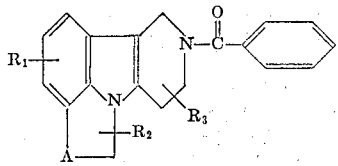

in which:
R₁ is a member selected from the group consisting of hydrogen, halogen, lower alkyl, lower alkoxy and trifluoromethyl;
R₂ is a member selected from the group consisting of hydrogen, lower alkyl and phenyl;
R₃ is a member selected from the group consisting of hydrogen and lower alkyl; and
A is a member selected from the group consisting of —CH₂— and —CH₂CH₂—.

5. A compound of the formula:

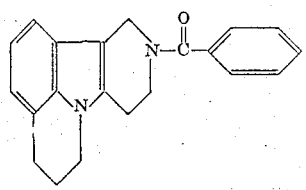

References Cited by the Examiner
UNITED STATES PATENTS

| | | | |
|---|---|---|---|
| 2,626,948 | 1/1953 | Finkelstein et al. | 260—293 |
| 2,750,386 | 6/1956 | Veldstra et al. | 260—293 |
| 2,876,229 | 3/1959 | Bloom | 260—288 |
| 2,877,230 | 3/1959 | Long et al. | 260—295 |
| 2,929,818 | 3/1960 | Janssen | 260—296 |
| 2,951,843 | 9/1960 | Haack et al. | 260—288 |

OTHER REFERENCES

Yudin et al., "Zhur. Ob. Khim.," vol 32, pp. 1544–50 (1962).

WALTER A. MODANCE, *Primary Examiner.*

N. S. RIZZO, *Examiner.*

R. PRICE, R. T. BOND, *Assistant Examiners.*